United States Patent
Hwang et al.

(10) Patent No.: US 10,734,643 B2
(45) Date of Patent: Aug. 4, 2020

(54) LITHIUM SECONDARY BATTERY

(71) Applicant: SK Innovation Co., Ltd., Seoul (KR)

(72) Inventors: Duck Chul Hwang, Daejeon (KR); Kyung Bin Yoo, Daejeon (KR); Kook Hyun Han, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 206 days.

(21) Appl. No.: 15/386,373

(22) Filed: Dec. 21, 2016

(65) Prior Publication Data

US 2017/0200944 A1    Jul. 13, 2017

(30) Foreign Application Priority Data

Jan. 13, 2016    (KR) .................. 10-2016-0004000

(51) Int. Cl.
| | |
|---|---|
| *H01M 4/36* | (2006.01) |
| *H01M 10/0525* | (2010.01) |
| *H01M 10/0567* | (2010.01) |
| *H01M 4/505* | (2010.01) |
| *H01M 4/525* | (2010.01) |
| *H01M 4/131* | (2010.01) |
| *H01M 4/133* | (2010.01) |

(52) U.S. Cl.
CPC ........... *H01M 4/366* (2013.01); *H01M 4/131* (2013.01); *H01M 4/505* (2013.01); *H01M 4/525* (2013.01); *H01M 10/0525* (2013.01); *H01M 10/0567* (2013.01); *H01M 4/133* (2013.01)

(58) Field of Classification Search
CPC .............................. H01M 4/505; H01M 4/525
See application file for complete search history.

(56) References Cited

U.S. PATENT DOCUMENTS

| | | | |
|---|---|---|---|
| 2008/0176142 A1 * | 7/2008 | Inagaki ................. | B60L 11/123 429/330 |
| 2013/0065135 A1 | 3/2013 | Takada et al. | |
| 2014/0027670 A1 * | 1/2014 | Sun ....................... | H01M 4/483 252/182.1 |

FOREIGN PATENT DOCUMENTS

KR    100752703 B1 *  8/2007

OTHER PUBLICATIONS

Sun, Yang-Kook, et al. "High-Voltage Performance of Concentration-Gradient Li[Ni0.67Co0.15Mn0.18]O2 Cathode Material for Lithium-Ion Batteries." Electrochimica Acta, vol. 55, No. 28, 2010, pp. 8621-8627. (Year: 2010).*

* cited by examiner

*Primary Examiner* — Stephan J Essex
(74) *Attorney, Agent, or Firm* — IP & T Group LLP

(57) ABSTRACT

Provided is a lithium secondary battery containing a cathode active material capable of preventing decreases in power and cycle life occurring at the time of adding a sulfur based additive used in order to improve high-temperature storage characteristics to an electrolyte.

5 Claims, 5 Drawing Sheets

LITHIUM SECONDARY BATTERY

CROSS-REFERENCE TO RELATED APPLICATION

This application claims priority to Korean Patent Application No. 10-2016-0004000 filed Jan. 13, 2016, the disclosure of which is hereby incorporated in its entirety by reference.

TECHNICAL FIELD

The following disclosure relates to a lithium secondary battery of which a trade-off of power and cycle life characteristics is significantly decreased and high-temperature storage characteristics are significantly improved by using a cathode active material having a concentration gradient and a non-aqueous electrolyte containing a sulfur based additive.

BACKGROUND

A cathode active material used in a battery is an important portion for improving performance of the battery, and particularly, in order to manufacture a battery having a high-energy density and high power performance, a high-capacity cathode active material is required.

In addition to improving performance of the battery through the high-capacity cathode active material, in order to improve storage capability of the battery at a high temperature, a sulfur based additive is mainly added to and used in an electrolyte. However, in the case of using the sulfur based additive, a cycle life of the battery is decreased, and power characteristics of the battery are deteriorated. Therefore, there is a need to solve problems occurring at the time of using the sulfur based additive while using the high-capacity cathode active material to improve performance of the battery.

The development of a novel technology capable of improving performance of the battery while hardly causing a trade-off of power and cycle life characteristics in spite of using the sulfur based additive as described above has been urgently demanded.

For example, a lithium battery using an electrolyte containing a solid sulfide, in which a specific metal element concentration is high in a portion contacting a solid electrolyte has been disclosed in U.S. Patent Application Publication No. 2013-0065135. However, in most studies, these technologies are to improve performance of the battery itself, and the development of a technology for a cathode active material capable of overcoming disadvantages of the lithium battery using the electrolyte containing the sulfur based additive was not reported.

RELATED ART DOCUMENT

Patent Document (Patent Document 1) U.S. Patent Application Publication No. 2013-0065135

SUMMARY

An embodiment of the present invention is directed to providing a battery capable of solving problems of a lithium ion secondary battery occurring due to a sulfur based electrolyte additive and capable of having significantly excellent high-temperature storage capability and cycle life characteristics by using the sulfur based electrolyte additive and a cathode active material having a concentration gradient formed in a predetermined region in a thickness direction of the cathode active material as a cathode material.

In one general aspect, a lithium secondary battery contains a cathode, an anode, and a non-aqueous electrolyte, wherein the non-aqueous electrolyte contains a sulfur based additive, and the cathode contains a cathode active material containing a lithium-metal oxide particle forming a concentration gradient. The concentration gradient type cathode active material may be a cathode active material in which a concentration of a metal is changed between a surface part and a core part of the lithium-metal oxide particle, and the present invention provides the lithium secondary battery containing the same.

DETAILED DESCRIPTION OF EMBODIMENTS

Hereinafter, the present invention will be described in detail. A description for the known function and configuration obscuring the present invention will be omitted in the following description and the accompanying drawings. Unless defined otherwise in the specification, it is to be understood that all terms used in the specification are construed as meaning as those that are generally used in the art.

The present invention, which relates to a battery having improved performance while containing a sulfur based additive in an electrolyte, relates to a lithium secondary battery capable of solving problems such as a decrease in power of the battery, or the like, occurring due to the sulfur based additive, and having excellent cycle life characteristics.

The present invention relates a lithium secondary battery including a cathode, an anode, and a non-aqueous electrolyte, wherein the non-aqueous electrolyte contains a sulfur based additive, and the cathode contains a cathode active material containing a lithium-metal oxide particle, the cathode active material having a concentration gradient layer in which a concentration of a metal contained in the lithium-metal oxide particle is changed between a surface part and a core part of the lithium-metal oxide particle.

In the present invention, the cathode active material is the lithium-metal oxide particle, the core part may mean a region from the real center of the lithium-metal oxide particle to a portion thereof having a radius, in which the concentration or composition of the metal contained in the lithium-metal oxide particle is constant, and the surface part may mean a region from an outermost portion of the lithium-metal oxide particle to an inner portion thereof, in which the concentration or composition of the metal contained in the lithium-metal oxide particle is constant. The concentration gradient is formed between the core part and the surface part of the cathode active material. In the present invention, the meaning of the constant concentration or composition includes a concentration or composition included in an error range acceptable in the art to which the present invention pertains. For example, in the present invention, the case in which an error in molar ratio of the metal contained in the lithium-metal oxide particle corresponding to the cathode active material contained in the lithium secondary battery is in a molar ratio range of ±0.001 to ±0.003 may be considered as the constant concentration or composition.

Figure 1:
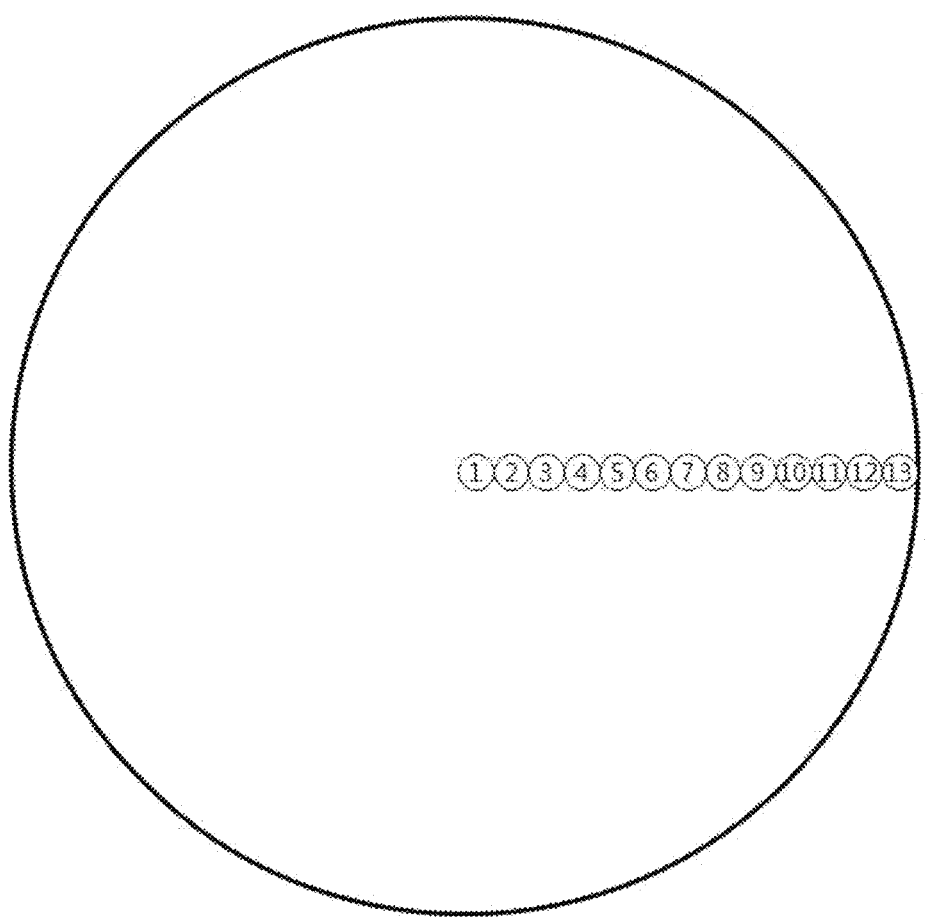
FIG. 1 is a cross-sectional view of a lithium-metal oxide particle used in Examples 1 to 24 and Comparative Examples 1 to 26, and schematically illustrates concentration measurement positions of a metal element.
Figure 2A:
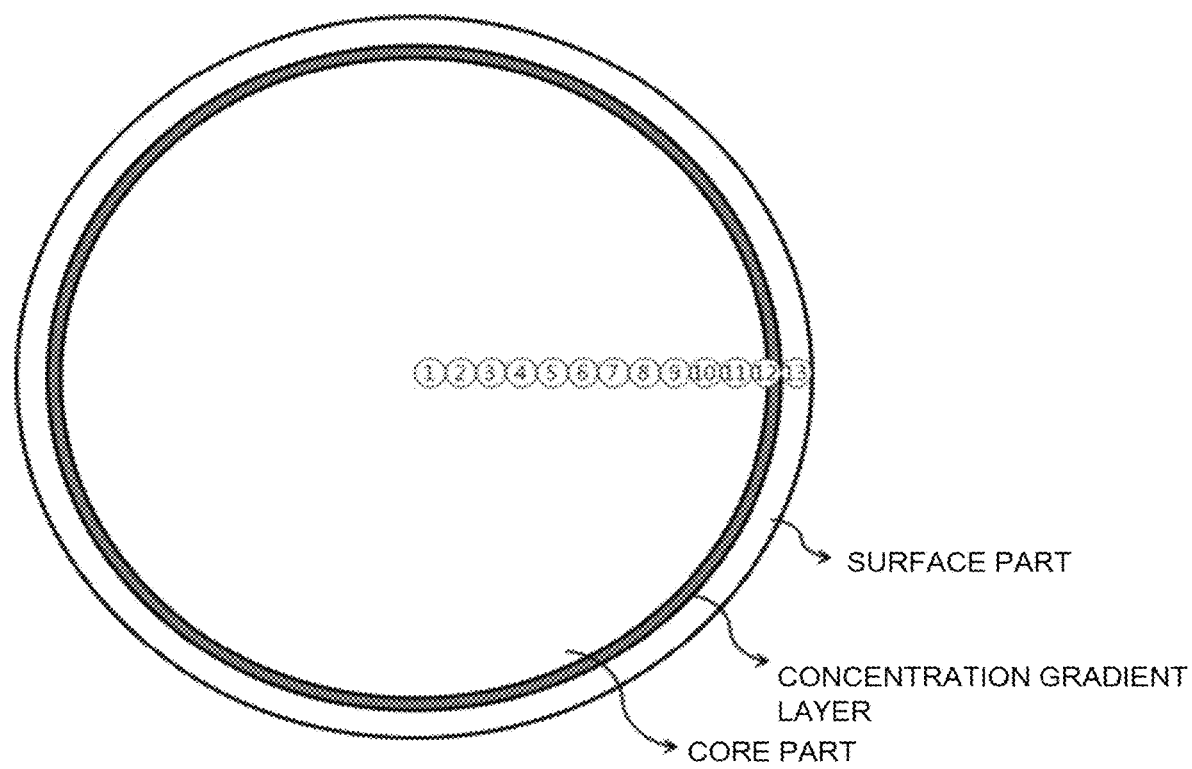
FIG. 2A is a schematic cross-sectional view of the lithium-metal oxide particle used in Examples 1 to 24 and Comparative Example 1.
Figure 2B:
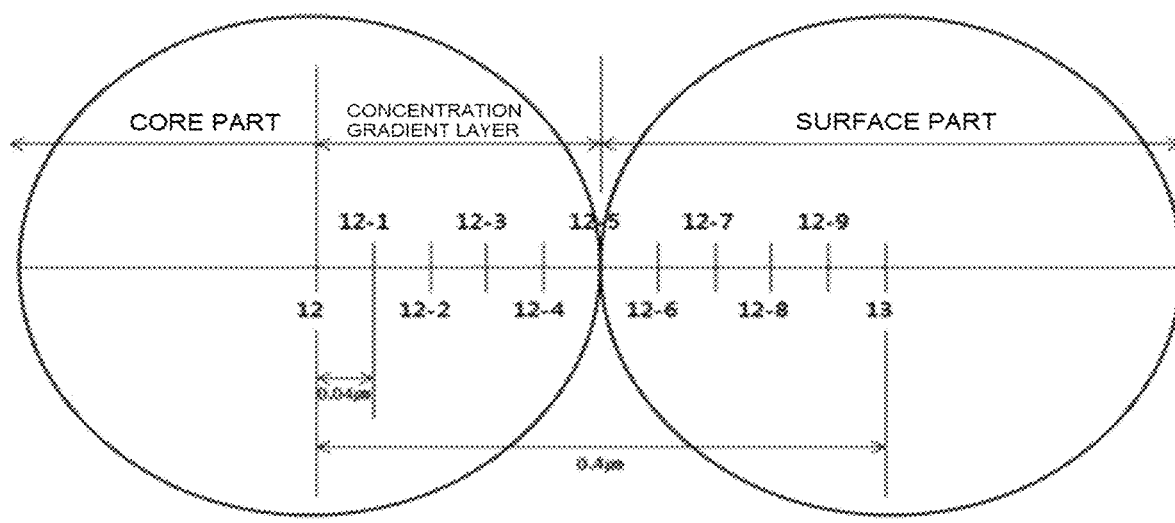
FIG. 2B is a cross-sectional view enlarged based on the concentration gradient layer and illustrates concentration measurement positions of a metal of the lithium-metal oxide particle used in Examples 1 to 24 and Comparative Example 1.
Figure 3A:
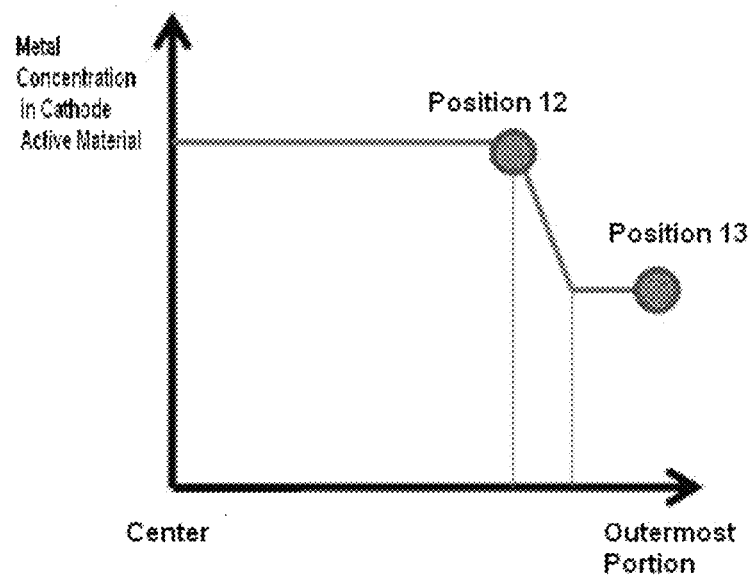
FIG. 3A illustrates a change in Ni concentration in the lithium-metal oxide particle used in Examples 1 to 24 and Comparative Example 1.
Figure 3B:
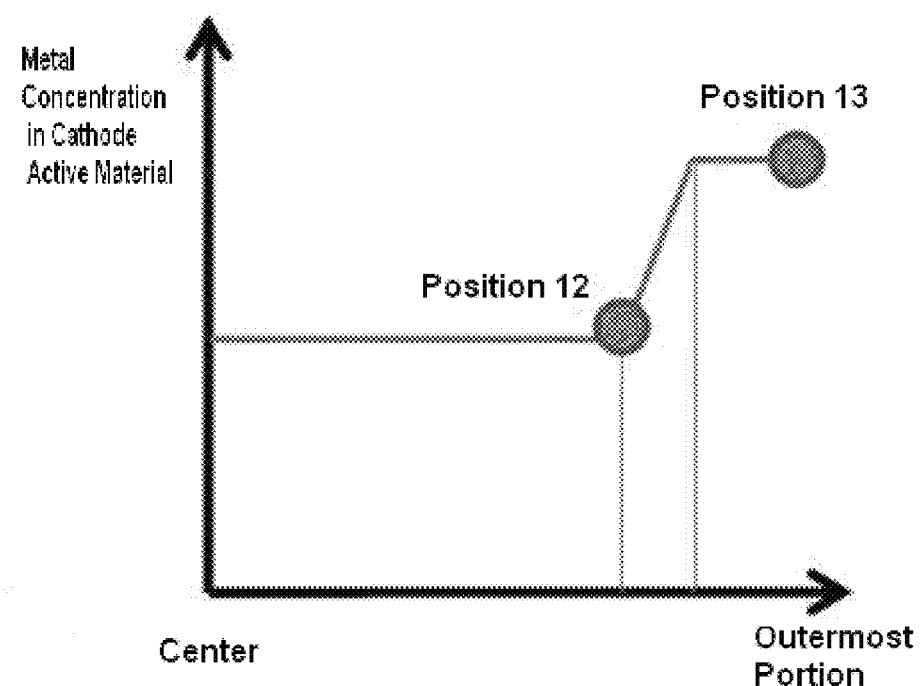
FIG. 3B illustrates a change in Mn concentration in the lithium-metal oxide particle used in Examples 1 to 24 and Comparative Example 1.
Figure 4:
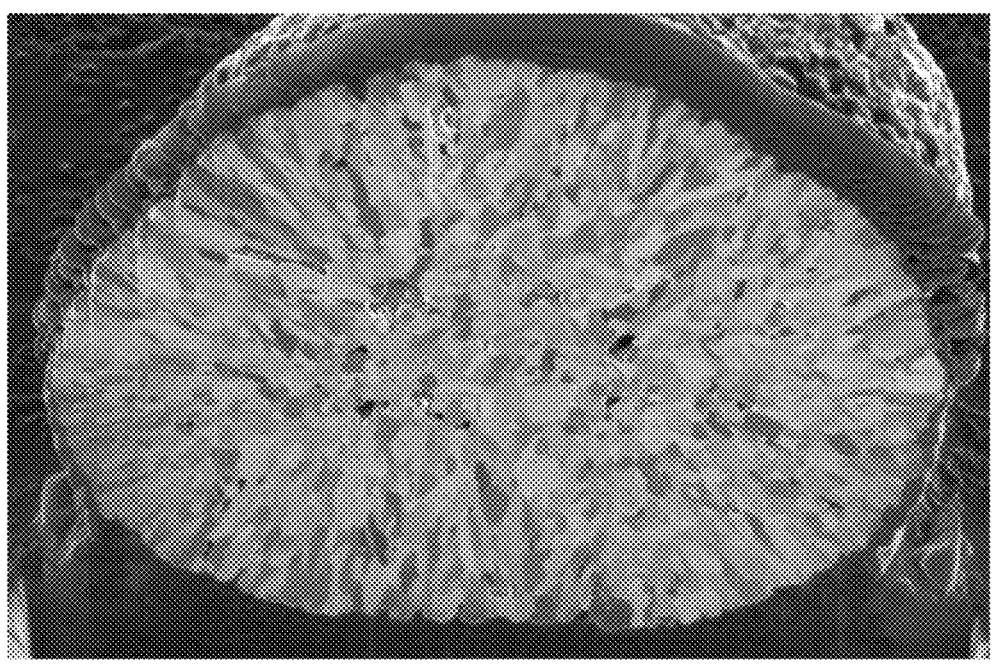
FIG. 4 is a cross-sectional photograph of the lithium-metal oxide particle used in Examples 1 to 24 and Comparative Example 1.
Figure 5:
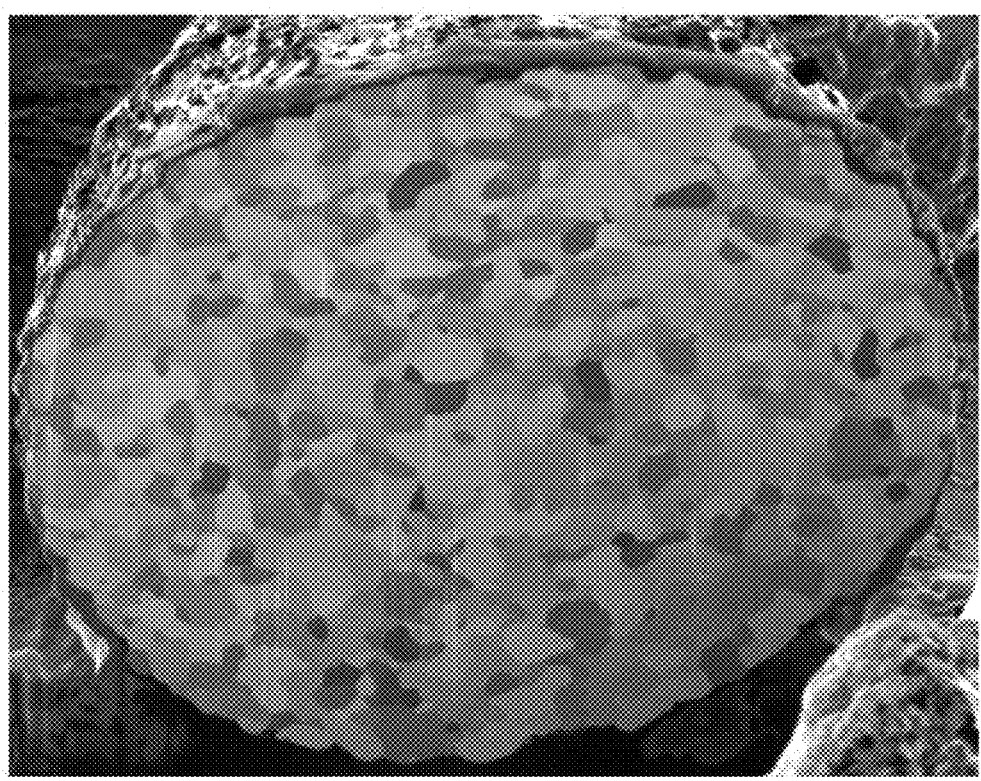
FIG. 5 is a cross-sectional photograph of the lithium-metal oxide particle used in Comparative Examples 2 to 26.

A shape of the cathode active material contained in the lithium secondary battery according to the present invention will be described in more detail with reference to FIGS. 1 and 2. FIG. 1, which is a cross-sectional view of the cathode active material according to the present invention, illustrates sections denoted by numbers 1 to 13 between the core part of the cathode active material and the outermost portion thereof, divided depending on a concentration measurement position and range. The center of the section denoted by number 1 is a real center, and the section denoted by number 13 contacts the outermost portion. Referring to FIG. 1, the sections denoted by numbers 1 to 12 may correspond to the core part, and the sections denoted by numbers 2 to 13 may correspond to the surface part. For example, the section denoted by number 1 corresponds to the core part and sections denoted by numbers 2 to 13 correspond to the surface part; the sections denoted by numbers 1 to 2 correspond to the core part, and the sections denoted by numbers 3 to 13 correspond to the surface part; the sections denoted by numbers 1 to 11 correspond to the core part, and the sections denoted by numbers 12 to 13 correspond to the surface part; or the sections denoted by numbers 1 to 12 correspond to the core part, and the section denoted by number 13 corresponds to the surface part, etc. The core part and the surface part of the cathode active material particle may be divided as described above, and the concentration gradient layer of the metal is formed between the core part and the surface part. In more detail, according to an exemplary embodiment of the present invention, the case in which the core part is a region from the center of the section denoted by number 1 to the center of the section denoted by number 12, the concentration gradient layer is formed in a portion between a central portion of the section denoted by number 12 and the center of the section denoted by number 13, and the surface part is a region from a portion of the section denoted by number 12 at which a concentration gradient is terminated to the section denoted by number 13 may be illustrated as in FIG. 2, and a concentration gradient of one or more metals contained in the lithium-metal oxide particle, the cathode active material, may be formed in the concentration gradient layer. The description of the cathode active material described with reference to FIGS. 1 and 2 is to assist in understanding of the present invention, and the present invention is not limited thereto.

According to the exemplary embodiment of the present invention, a portion in which a concentration gradient of the metal is continuously or gradationally formed between the core part and the surface part of cathode active material may be included in the cathode active material. The concentration gradient as described above may significantly improve high-temperature storage characteristics while minimizing decreases in power and cycle life of a lithium battery, which may occur due to the sulfur based additive contained in the non-aqueous electrolyte.

The cathode active material contained in the cathode of the lithium secondary battery, which is a lithium-metal oxide having the concentration gradient layer, may improve performance of the battery. Particularly, even in the case of using the sulfur based additive in the electrolyte, problems such as decreases in cycle life and power due to the sulfur based additive hardly occur, and storage characteristics are significantly improved, thereby making it possible to manufacture a secondary battery having balanced performance.

According to the present invention, the cathode active material contains the lithium-metal oxide particle, and at least one metal contained in the lithium-metal oxide particle except for lithium forms the concentration gradient layer in which a concentration of the metal is changed between the surface part and the core part. The concentration gradient layer means a layer having concentration distribution in which the concentration of the metal is changed in a constant trend between the surface part and the core part. Here, the constant trend may be a continuous or gradational change in concentration occurring in a predetermined section between the surface part and the core part.

In the present invention, the lithium-metal oxide particle is not limited as long as it is used in a lithium battery, but may be, for example, represented by the following Chemical Formula 1.

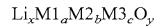  [Chemical Formula 1]

(In Chemical Formula 1, M1, M2, and M3 are each independently different metals selected from the group consisting of Ni, Co, Mn, Na, Mg, Ca, Ti, V, Cr, Cu, Zn, Ge, Sr, Ag, Ba, Zr, Nb, Mo, Al, Ga, B, and a combination thereof, and x, y, a, b, and c satisfy $0<x\leq1.1$, $2\leq y\leq2.02$, $0\leq a\leq1$, $0\leq b\leq1$, $0\leq c\leq1$, and $0<a+b+c\leq1$.)

In the lithium-metal oxide particle, a concentration of at least one metal of M1, M2, and M3 in Chemical Formula 1 is changed between the surface part and the core part. That is, the lithium-metal oxide particle contained in the cathode active material may contain at least one metal having a concentration gradient.

According to the exemplary embodiment of the present invention, concentration gradients of different metals contained in the lithium-metal oxide particle may be contrary to each other. In addition, another metal having a constant concentration between the surface part and the core part may be further contained in the lithium-metal oxide particle together with the metals having concentration gradients contrary to each other. The metals having concentration gradients contrary to each other may be represented by first and third metals M1 and M3, and it is preferable that the metals having concentration gradients contrary to each other are each independently one or more different metals. The metal having a constant concentration may be represented by a second metal M2, and it is preferable that the second metal M2 is one or more metals different from the first and third metals M1 and M3.

According to the present invention, the lithium-metal oxide particle represented by Chemical Formula 1 may have a concentration gradient layer of the metal M1 in which a concentration of the metal M1 is decreased in a surface direction between the surface part and the core part, contain a constant concentration of the metal M2 between the surface part and the core part, and have a concentration gradient layer of the metal M3 in which a concentration of the metal M3 is increased in the surface direction between the surface part and the core part.

In the present invention, the metals contained in the lithium-metal oxide particle, the cathode active material contained in the lithium secondary battery, are not limited as long as they are used in the lithium battery, but may be, for example, Ni, Co, and Mn, and may be represented by the following Chemical Formula 2.

$$Li_xNi_aCo_bMn_cO_y$$ [Chemical Formula 2]

(Here, x, y, a, b, and c satisfy $0<x\leq1.1$, $2\leq y\leq2.02$, $0\leq a\leq1$, $0\leq b\leq1$, $0\leq c\leq1$, and $0<a+b+c\leq1$.)

According to the exemplary embodiment of the present invention, in the case in which the metals contained in the lithium-metal oxide particle are Ni, Co, and Mn, and are represented by Chemical Formula 2, the lithium-metal oxide particle may have a concentration gradient layer of a Ni metal in which a concentration of the Ni metal is decreased in the surface direction between the surface part and the core part, contain a constant concentration of a Co metal between the surface part and the core part, and have a concentration gradient layer of a Mn metal in which a concentration of the Mn metal is increased in the surface direction between the surface part and the core part.

The lithium secondary battery using the cathode active material in which the concentration of the metal contained in the lithium-metal oxide particle is changed as described above has excellent cycle life characteristics as compared to a lithium secondary battery using a cathode active material in which a concentration of a metal is not changed, and containing a sulfur based additive.

A concentration range of the metal in the lithium-metal oxide particle used in the present invention may be adjusted but is not particularly limited.

For example, according to the exemplary embodiment of the present invention, in Chemical Formula 2, a range of a capable of indicating a change in concentration of Ni may satisfy $0.60\leq a\leq0.95$, $0.70\leq a\leq0.90$, preferably $0.75\leq a\leq0.85$, but is not limited thereto. According to the exemplary embodiment of the present invention, in Chemical Formula 2, a range of c capable of indicating a change in concentration of Mn may satisfy $0.065\leq c\leq0.140$, $0.075\leq c\leq0.135$, $0.080\leq c\leq0.130$, preferably $0.085\leq c\leq0.125$, but is not limited thereto. According to still another exemplary embodiment of the present invention, in Chemical Formula 2, a sum (b+c) of the concentrations of Co of which the concentration is constant and Mn of which the concentration is increased between the surface part and the core part may satisfy $0.050\leq b+c\leq0.400$, $0.100\leq b+c\leq0.350$, $0.100\leq b+c\leq0.350$, $0.150\leq b+c\leq0.300$, preferably $0.200\leq b+c\leq0.250$, but is not limited thereto.

According to another embodiment of the present invention, a lithium secondary battery includes a cathode, an anode, and a non-aqueous electrolyte, wherein the non-aqueous electrolyte contains a sulfur based additive, and the cathode contains a lithium-metal oxide particle, the lithium-metal oxide particle, which is a cathode active material, including a core part represented by Chemical Formula 3 and a surface part represented by Chemical Formula 4, a concentration of M1 being decreased in a surface direction between the core part and the surface part, and a concentration of M3 being increased in the surface direction between the core part and the surface part.

$$Li_{x2}M1_{a2}M2_{b2}M3_{c2}O_{y2}$$ [Chemical Formula 3]

$$Li_{x3}M1_{a3}M2_{b3}M3_{c3}O_{y3}$$ [Chemical Formula 4]

(In Chemical Formulas 3 and 4, M1, M2, and M3 are each independently different metals selected from the group consisting of Ni, Co, Mn, Na, Mg, Ca, Ti, V, Cr, Cu, Zn, Ge, Sr, Ag, Ba, Zr, Nb, Mo, Al, Ga, B, and a combination thereof, and x2, x3, y2, y3, a2, a3, b2, b3, c2, and c3 satisfy $0<x2\leq1.1$, $0<x3\leq1.1$, $2\leq y2\leq2.02$, $2\leq y3\leq2.02$, $0\leq a2\leq1$, $0\leq a3\leq1$, $0\leq b2\leq1$, $0\leq b3\leq1$, $0\leq c2\leq1$, $0\leq c3\leq1$, $0<a2+b2+c2\leq1$, $0<a3+b3+c3\leq1$, $a3<a2$, and $c2<c3$.)

In Chemical Formulas 3 and 4, M2 may be a metal having a constant concentration between the core part and the surface part.

According to the exemplary embodiment of the present invention, in Chemical Formulas 3 and 4, M1 may be Ni, M2 may be Co, M3 may be Mn, the core part may be represented by Chemical Formula 5, and the surface part may be represented by Chemical Formula 6.

$$Li_{x4}Ni_{a4}Co_{b4}Mn_{c4}O_{y4}$$ [Chemical Formula 5]

$$Li_{x5}Ni_{a5}Co_{b5}Mn_{c5}O_{y5}$$ [Chemical Formula 6]

(In Chemical Formulas 5 and 6, x4, x5, y4, y5, a4, a5, b4, b5, c4, and c5 satisfy $0<x4\leq1.1$, $0<x5\leq1.1$, $2\leq y4\leq2.02$, $2\leq y5\leq2.02$, $0.800\leq a4\leq1.000$, $0-a5\leq0.770$, $0\leq b4\leq1.000$, $0\leq b5\leq1.000$, $0\leq c4\leq0.090$, $0.120\leq c5\leq1.000$, $0<a4+b4+c4\leq1$, and $0<a5+b5+c5\leq1$.)

In Chemical Formulas 5 and 6, a concentration of Co may be constant between the core part and the surface part.

A lithium secondary battery manufactured by using a lithium-metal oxide for a cathode active material in which a concentration gradient is formed as a cathode material, and adding a sulfur based additive to a non-aqueous electrolyte while using nickel, cobalt, and manganese as metals contained in the lithium-metal oxide and adjusting composition ratios thereof as in Chemical Formulas 5 and 6 may further minimize a trade-off of power and cycle life characteristics. According to the exemplary embodiment of the present invention, when a range in which a concentration gradient of Ni is formed is 0.770 to 0.800, and a range in which a concentration gradient of Mn is formed is 0.090 to 0.120, a concentration gradient may not be rapidly formed between the core part and the surface part, the cathode active material may be structurally stable, and an effect of improving characteristics of the lithium secondary battery by the sulfur based additive and an effect of suppressing the trade-off of the power and cycle life characteristics by the sulfur based additive may be more excellent.

According to the present invention, it is possible to solve problems such as decreases in power and cycle life by the sulfur based additive added to the electrolyte, and further improve high-temperature storage characteristics which are the reason why the sulfur based additive is added.

The sulfur based additive added to the electrolyte, which is preferably a sultone based additive, may be 1,3-propane sultone, 1,3-propene sultone, or a mixture thereof. The sulfur based additive used in a battery is an additive improving high-temperature storage characteristics but may decrease cycle life and power of the battery. However, according to the present invention, the concentration gradient layer of one or more metals is formed between the surface part and the core part of the lithium-metal oxide particle, the cathode active material, thereby making it possible to minimize the trade-off of the power and cycle life characteristics while improving the high-temperature storage characteristics by the sulfur based additive.

A content of 1,3-propane sultone, 1,3-propene sultone, or the mixture thereof, which is the sulfur based additive added to the electrolyte, is not particularly limited, and may be contained in a range suitable for preventing a decrease in power of the battery and improving storage characteristics and the cycle life of the battery. For example, according to the exemplary embodiment of the present invention, in the case of using 1,3-propane sultone as the sulfur based additive added to the electrolyte, 0.1 to 3.0 wt %, 0.5 to 2.5 wt %, 0.5 to 1.5 wt %, and preferably, 0.5 to 2.0 wt % of 1,3-propane sultone may be contained in the electrolyte, but the content is not limited thereto. According to another exemplary embodiment of the present invention, in the case of using 1,3-propene sultone as the sulfur based additive added to the electrolyte, 0.1 to 3.0 wt %, 0.5 to 2.5 wt %, 0.5 to 1.5 wt %, and preferably, 0.5 to 2.0 wt % of 1,3-propene sultone may be contained in the electrolyte, but the content is not limited thereto. According to another exemplary embodiment of the present invention, in the case of using the mixture of 1,3-propane sultone and 1,3-propene sultone as the sulfur based additive added to the electrolyte, high-temperature storage characteristics and cycle life characteristics may be more excellent. In the case of using the mixture of 1,3-propane sultone and 1,3-propene sultone as the sulfur based additive added to the electrolyte, 0.1 to 4.0 wt %, 0.1 to 3.5 wt %, 0.1 to 3.0 wt %, 0.1 to 2.5 wt %, 0.5 to 4.0 wt %, 0.5 to 3.5 wt %, 0.5 to 3.0 wt %, 0.5 to 2.5 wt %, 1.0 to 4.0 wt %, 1.0 to 3.5 wt %, 1.0 to 2.5 wt %, and preferably 1.0 to 3.0 wt % of the mixture of 1,3-propane sultone and 1,3-propene sultone may be contained in the electrolyte, but content is not limited thereto. In this case, it is possible to more effectively suppress a decrease in cycle life by the trade-off while improving high-temperature storage characteristics.

In the present invention, a shape of the lithium-metal oxide particle is not particularly limited, but it is preferable that as a primary particle becomes close to the surface part of the lithium-metal oxide particle, the primary particle may have a rod-type shape.

In the present invention, a particle size of the lithium-metal oxide is not particularly limited, but may be, for example, 3 to 25 μm.

The cathode active material according to the present invention may be a lithium-metal oxide further including a coating layer. The coating layer may be formed of a metal or metal oxide, for example, Al, Ti, Ba, Zr, Si, B, Mg, P, and an alloy or oxide thereof.

The cathode active material according to the present invention may be a lithium-metal oxide doped with a metal ingredient. For example, a metal capable of being doped may be Al, Ti, Ba, Zr, Si, B, Mg, P, V, and a combination thereof.

The present invention may provide a lithium secondary battery manufactured using the above-mentioned cathode active material and the electrolyte containing the sulfur based additive.

The lithium secondary battery may be manufactured to include a cathode, an anode, and a non-aqueous electrolyte.

The cathode and the anode may be manufactured by mixing and stirring the cathode active material according to the present invention and an anode active material with a solvent, if necessary, a binder, a conductive material, a dispersant, and the like, to prepare electrode mixtures, respectively, applying (coating) and drying the electrode mixtures on current collectors of a metal material, and then pressing the applied electrode mixtures, respectively.

In the present invention, as the cathode active material, the lithium-metal oxide particle having the concentration gradient suitable for achieving the object of the present invention may be prepared by a method known in the art and then used, and a preparation method thereof is not limited.

As the anode active material, an active material generally used in an anode of a secondary battery may be used. As an example, in the lithium secondary battery, the anode active material may be a material capable of intercalating lithium. As a non-restrictive example, the anode active material may be at least one material selected from the anode active material group consisting of lithium (metal lithium), easily graphitizable carbon, hardly graphitizable carbon, graphite, silicon, a Sn alloy, a Si alloy, a Sn oxide, a Si oxide, a Ti oxide, a Ni oxide, a Fe oxide (FeO), and lithium-titanium oxides ($LiTiO_2$, and $Li_4Ti_5O_{12}$) and be a composite of at least two materials selected from the anode active material group.

As the binder, any binder may be used without particular limitation as long as it is used in the art. For example, an organic binder such as a polyvinylidenefluoride-hexafluoropropylene copolymer (PVDF-co-HFP), polyvinylidenefluoride (PVDF), polyacrylonitrile, polymethylmethacrylate, and the like, or an aqueous binder such as styrene-butadiene rubber (SBR), or the like, may be used together with a thickener such as carboxymethyl cellulose (CMC).

As the conductive material, a general conductive carbon material may be used without particular limitation.

As the current collect of the metal material, any metal may be used as long as the electrode mixtures of the cathode or anode active material may be easily adhered to the metal, and the metal does not have reactivity in a voltage range of a battery. As a non-restrictive example of a cathode current collector, there is foil made of aluminum, nickel or a combination thereof, and the like, and as a non-restrictive example of an anode current collector, there is foil made of copper, gold, nickel, a copper alloy, or a combination thereof, and the like.

A separator is interposed between the cathode and the anode, and as the separator, a general porous polymer film used as a separator according to the related art may be used. For example, a porous polymer film made of a polyolefin based polymer such as an ethylene homopolymer, a propylene homopolymer, an ethylene/butene copolymer, an ethylene/hexene copolymer, an ethylene/methacrylate copolymer, or the like, may be used alone, or these porous polymer films are stacked and then used. Further, general porous non-woven fabric, for example, non-woven fabric made of high-melting point glass fiber, polyethylene terephthalate fiber, or the like, may be used. As a method of applying the separator to the battery, a method of laminating (stacking) the separator and electrodes, a folding method, and the like, as well as a winding method, which is a general method, may be used.

In the present invention, the non-aqueous electrolyte contains a lithium salt, an electrolyte, and an organic solvent, and as the lithium salt, any lithium salt may be used without limitation as long as it is generally used in an electrolyte for a lithium secondary battery, and may be represented by $Li^+X^-$.

An anion of the lithium salt is not particularly limited, but any one or more selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

As the organic solvent, any one or a mixture of two or more selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, sulfolane, gamma-butyrolactone, and tetrahydrofuran may be used.

The non-aqueous electrolyte is injected into an electrode structure composed of the cathode, the anode, and the separator interposed between the cathode and the anode.

There is no particular limitation in an outer shape of the lithium secondary battery, but the lithium secondary battery may be a cylindrical or prismatic battery using a can, a pouch-type or coin-type battery, or the like.

Hereinafter, the present invention will be described in detail through Examples. The following Examples are described in order to assist in understanding the exemplary embodiment of the present invention, but the present invention is not limited thereto.

Evaluation of Battery Characteristics

1. Power Characteristics

Power characteristics of batteries manufactured in Examples and Comparative Examples were measured according to hybrid pulse power characterization (HPPC) by FreedomCar battery test manual.

2. High-Temperature Storage Characteristics

After keeping batteries manufactured in Examples and Comparative Examples in a high temperature chamber (60□) for 4 weeks in a SOC100 charge (1 C 4.2V 0.1 C CUT-OFF) state and keeping the batteries at room temperature for 12 hours, recovery charge capacity thereof was measured under the same 1 C condition.

3. Cycle Life Characteristics

After repeating a charging operation (1 C 4.2V 0.1 C CUT-OFF) and a discharging operation (1 C 3.0V CUT-OFF) 500 times using the batteries manufactured in Examples and Comparative Examples, a percentage of a value obtained by dividing discharge capacity at $500^{th}$ cycle by discharge capacity at $1^{st}$ cycle was illustrated.

Examples 1 to 24

Manufacturing of Cathode

As a cathode active material, lithium-metal oxides (hereinafter, CAM10) of which an entire composition was $LiNi_{0.80}Co_{0.11}Mn_{0.09}O_2$, a composition of a core part was $LiNi_{0.802}Co_{0.11}Mn_{0.088}O_2$ (Number in Table 1: 1 to 12), a composition of a surface part was $LiNi_{0.77}Co_{0.11}Mn_{0.12}O_2$ (Number in Table 1: 12-5 to 13), and a concentration gradient layer was formed between the core part and the surface part (see 12 to 12-5 in Table 1) to have concentration gradients of nickel and manganese were used. After preparing cathode slurry using Denka black as a conductive material and PVDF as a binder so that a mass ratio of the lithium-metal oxide, the conductive material, and the binder was 92:5:3, the cathode slurry was coated, dried, and pressed on an aluminum substrate, thereby manufacturing a cathode.

A concentration gradient of the lithium-metal oxide is as illustrated in the following Table 1, and the concentration gradient layer and concentration measurement positions are as illustrated in FIG. 1. The concentration measurement positions were set at an interval of 0.4 μm from the center of a lithium-metal oxide particle in which a distance between the center of the particle and a surface thereof was 4.8 μm, and a molar ratio of each metal contained in the lithium-metal oxide was measured at the positions 1 to 12 from the real center of the lithium-metal oxide. In addition, between the positions 12 and 13, a molar ratio of each metal was measured at an interval of 0.04 μm (40 nm). Positions at which the concentration of each metal was measured at the interval of 0.04 μm (40 nm) between the positions 12 and 13 were represented by positions 12-1, 12-2, 12-3, 12-4, 12-5, 12-6, 12-7, 12-8, and 12-9.

TABLE 1

Metal Concentration Measurement Depending on Position from Core part of Lithium-Metal Oxide particle to Surface Part Thereof

| Position (Number) | Molar Ratio of Ni | Molar Ratio of Co | Molar Ratio of Mn |
|---|---|---|---|
| 1 | 0.802 | 0.110 | 0.088 |
| 2 | 0.801 | 0.111 | 0.088 |
| 3 | 0.802 | 0.110 | 0.088 |
| 4 | 0.802 | 0.110 | 0.088 |
| 5 | 0.803 | 0.111 | 0.086 |
| 6 | 0.802 | 0.110 | 0.088 |
| 7 | 0.802 | 0.110 | 0.088 |
| 8 | 0.802 | 0.109 | 0.089 |
| 9 | 0.801 | 0.110 | 0.089 |
| 10 | 0.802 | 0.110 | 0.088 |
| 11 | 0.802 | 0.108 | 0.090 |
| 12 | 0.800 | 0.110 | 0.090 |
| 12-1 | 0.794 | 0.110 | 0.096 |
| 12-2 | 0.789 | 0.109 | 0.102 |
| 12-3 | 0.782 | 0.110 | 0.108 |
| 12-4 | 0.777 | 0.110 | 0.113 |
| 12-5 | 0.770 | 0.110 | 0.120 |
| 12-6 | 0.771 | 0.110 | 0.119 |
| 12-7 | 0.770 | 0.110 | 0.120 |
| 12-8 | 0.769 | 0.111 | 0.120 |
| 12-9 | 0.770 | 0.109 | 0.121 |
| 13 | 0.770 | 0.110 | 0.120 |

Manufacturing of Anode

An anode slurry containing 93 wt % of natural graphite as an anode active material, 5 wt % of KS6, which is a flake type conductive material, as a conductive material, 1 wt % of styrene-butadiene rubber (SBR) as a binder, and 1 wt % of carboxymethyl cellulose (CMC) as a thickener was coated, dried, and pressed on a copper substrate, thereby manufacturing an anode.

Manufacturing of Battery

A battery was configured by notching and stacking the cathode and the anode at a suitable size and interposing a separator (polyethylene, thickness: 25 μm) between the cathode and the anode, and tap portions of the cathode and the anode were welded, respectively. An assembly of the welded cathode/separator/anode was put into a pouch, and three surfaces of the pouch except for an electrolyte injection surface thereof were sealed. Here, portions in which the tap was positioned were included in sealing sites. After injecting the electrolyte through the surface that was not sealed, the remaining surface was also sealed, and impregnation was performed for 12 hours or more. As the electrolyte, an electrolyte obtained by preparing 1M $LiPF_6$ solution using a mixed solvent of ethylene carbonate (EC), ethylmethyl carbonate (EMC), and dimethyl carbonate (DMC) (volume ratio; 25/45/30 (EC:EMC:DMC)) and basically adding 1 wt % of vinylene carbonate (VC) was used, and an electrolyte to which 1,3-propane sultone (PS) and 1,3-propene sultone (PRS) were additionally added was also used (Examples 1 to 24 and Comparative Examples 3 to 26).

Thereafter, per-charging was performed for 36 hours using a current (2.5 A) corresponding to 0.25 C. After 1 hour, degassing was performed, aging was performed for 24 hours or more, and then, initial charging and discharging was performed (charging condition: CC-CV 0.2 C 4.2V 0.05 C CUT-OFF, discharging condition: CC 0.2 C 2.5V CUT-OFF). Then, standard charging and discharging was performed (charging condition: CC-CV 0.5 C 4.2V 0.05 C CUT-OFF, discharging condition: CC 0.5 C 2.5V CUT-OFF).

Evaluation of Battery Characteristics

Power, high-temperature storage characteristics, and cycle life characteristics of the batteries manufactured in Examples 1 to 24 were evaluated and illustrated in Table 2.

TABLE 2

| Classification | Cathode Active Material | PS (wt %) | PRS (wt %) | Power (W/kg) | Capacity Recovery Rate (%) after Keeping Battery at 60□ for 4 Weeks | Cycle Life Retention Rate (%) After 500 Cycles |
|---|---|---|---|---|---|---|
| Example 1 | CAM10 | 0.5 | 0 | 2469 | 73.4 | 85.0 |
| Example 2 | CAM10 | 1 | 0 | 2463 | 76.1 | 85.0 |
| Example 3 | CAM10 | 1.5 | 0 | 2452 | 78.9 | 84.9 |
| Example 4 | CAM10 | 2 | 0 | 2438 | 80.7 | 84.9 |
| Example 5 | CAM10 | 0 | 0.5 | 2461 | 74.6 | 84.8 |
| Example 6 | CAM10 | 0 | 1 | 2439 | 77.9 | 84.8 |
| Example 7 | CAM10 | 0 | 1.5 | 2417 | 80.9 | 84.6 |
| Example 8 | CAM10 | 0 | 2 | 2403 | 85.4 | 84.8 |
| Example 9 | CAM10 | 0.5 | 0.5 | 2449 | 77.1 | 84.9 |
| Example 10 | CAM10 | 0.5 | 1 | 2432 | 80.2 | 85.0 |
| Example 11 | CAM10 | 0.5 | 1.5 | 2408 | 84.6 | 84.8 |
| Example 12 | CAM10 | 0.5 | 2 | 2391 | 87 | 84.6 |
| Example 13 | CAM10 | 1 | 0.5 | 2437 | 80.2 | 84.7 |
| Example 14 | CAM10 | 1 | 1 | 2417 | 82.4 | 84.5 |
| Example 15 | CAM10 | 1 | 1.5 | 2398 | 87.2 | 84.6 |
| Example 16 | CAM10 | 1 | 2 | 2377 | 89.7 | 84.7 |
| Example 17 | CAM10 | 1.5 | 0.5 | 2432 | 82.7 | 84.8 |
| Example 18 | CAM10 | 1.5 | 1 | 2413 | 85.9 | 84.8 |
| Example 19 | CAM10 | 1.5 | 1.5 | 2387 | 88.5 | 84.4 |
| Example 20 | CAM10 | 1.5 | 2 | 2371 | 93.2 | 77.9 |
| Example 21 | CAM10 | 2 | 0.5 | 2419 | 85.1 | 84.7 |
| Example 22 | CAM10 | 2 | 1 | 2397 | 87.4 | 84.8 |
| Example 23 | CAM10 | 2 | 1.5 | 2378 | 91.2 | 83.4 |
| Example 24 | CAM10 | 2 | 2 | 2361 | 95.6 | 76.9 |

In the batteries in Examples, even though PS, PRS, or a mixture thereof, which is a sulfur based electrolyte additive, was contained, there was almost no decrease in power, and high-temperature storage characteristics and a cycle life retention rate were excellent. Particularly, in most cases, the cycle life retention rate was 80% or more, such that cycle life characteristics were significantly excellent.

Comparative Examples 1 to 26

Batteries in Comparative Examples 3 to 26 were manufactured in the same manner in Examples 1 to 24 except for using $LiNi_{0.8}Co_{0.1}Mn_{0.1}O_2$ (hereinafter, CAM20) having a uniform composition in an entire particle as a cathode active material. In Comparative Example 1, a battery was manufactured using CAM10, which is the cathode active material having a concentration gradient, without adding PS or PRS as an additive. In Comparative Example 2, a battery was manufactured using CAM20, which is the cathode active material having a uniform composition in an entire particle, without adding PS or PRS as an additive.

Power, high-temperature storage characteristics, and cycle life characteristics of the batteries manufactured in Comparative Examples 1 to 26 were evaluated and illustrated in Table 3.

TABLE 3

| Classification | Cathode Active Material | PS (wt %) | PRS (wt %) | Power (W/kg) | Capacity Recovery Rate (%) after Keeping Battery at 60□ for 4 Weeks | Cycle Life Retention Rate (%) After 500 Cycles |
|---|---|---|---|---|---|---|
| Comparative Example 1 | CAM10 | 0 | 0 | 2480 | 71 | 85 |
| Comparative Example 2 | CAM20 | 0 | 0 | 2500 | 71 | 68 |
| Comparative Example 3 | CAM20 | 0.5 | 0 | 2473 | 73.1 | 67.8 |
| Comparative Example 4 | CAM20 | 1 | 0 | 2439 | 74.9 | 67.7 |
| Comparative Example 5 | CAM20 | 1.5 | 0 | 2412 | 76.7 | 67.6 |
| Comparative Example 6 | CAM20 | 2 | 0 | 2378 | 79.4 | 67.1 |
| Comparative Example 7 | CAM20 | 0 | 0.5 | 2451 | 74.2 | 67.7 |
| Comparative Example 8 | CAM20 | 0 | 1 | 2397 | 76.5 | 67.4 |
| Comparative Example 9 | CAM20 | 0 | 1.5 | 2348 | 79.7 | 67.2 |
| Comparative Example 10 | CAM20 | 0 | 2 | 2299 | 83.4 | 66.6 |
| Comparative Example 11 | CAM20 | 0.5 | 0.5 | 2423 | 75.9 | 67.5 |
| Comparative Example 12 | CAM20 | 0.5 | 1 | 2372 | 79.1 | 67.2 |
| Comparative Example 13 | CAM20 | 0.5 | 1.5 | 2319 | 81.9 | 66.9 |
| Comparative Example 14 | CAM20 | 0.5 | 2 | 2271 | 85.7 | 62.9 |
| Comparative Example 15 | CAM20 | 1 | 0.5 | 2393 | 77.7 | 67.4 |
| Comparative Example 16 | CAM20 | 1 | 1 | 2342 | 81.4 | 67 |
| Comparative Example 17 | CAM20 | 1 | 1.5 | 2288 | 83.5 | 60.7 |
| Comparative Example 18 | CAM20 | 1 | 2 | 2239 | 86.4 | 56.1 |
| Comparative Example 19 | CAM20 | 1.5 | 0.5 | 2361 | 79.7 | 67.6 |
| Comparative Example 20 | CAM20 | 1.5 | 1 | 2313 | 83.4 | 60.3 |
| Comparative Example 21 | CAM20 | 1.5 | 1.5 | 2257 | 86.1 | 59.5 |
| Comparative Example 22 | CAM20 | 1.5 | 2 | 2212 | 88.5 | 51.6 |
| Comparative Example 23 | CAM20 | 2 | 0.5 | 2327 | 81.7 | 64.3 |
| Comparative Example 24 | CAM20 | 2 | 1 | 2278 | 85.4 | 60.2 |
| Comparative Example 25 | CAM20 | 2 | 1.5 | 2231 | 87.7 | 57.2 |
| Comparative Example 26 | CAM20 | 2 | 2 | 2177 | 91.7 | 48.5 |

Referring to Tables 2 and 3, in Examples in which the cathode active material having a concentration gradient formed between the surface part and the core part was contained, high-temperature storage characteristics and power characteristics were similar to those in Comparative Examples, but cycle life characteristics were significantly excellent.

It may be appreciated that in the case of using CAM20 corresponding to the cathode active material not having the concentration gradient and using PS or PRS corresponding to the electrolyte additive, high-temperature storage characteristics were improved, but power was decreased, and cycle life characteristics were deteriorated. Particularly, in all of the batteries in Comparative Examples, a cycle life retention rate was less than 70% due to deterioration of cycle life characteristics. That is, the existing problems occurring in the case of using the sulfur based additive still remained.

On the contrary, it may be confirmed that in the case of using CAM10 corresponding to the cathode active material having the concentration gradient and using PS or PRS corresponding to the sulfur based electrolyte additive, high-temperature storage characteristics were significantly improved, but decreases in power and cycle life were not large as compared to the case of using CAM20. Therefore, in the case of using CAM10 corresponding to the cathode active material containing the lithium-metal oxide having a concentration gradient, even in the case of using PS or PRS causing a trade-off such as decreases in power and cycle life, it is possible to manufacture a significantly excellent lithium secondary battery of which high-temperature storage characteristics were excellent and in which there was almost no trade-off such as decreases in power and cycle life.

According to the present invention, it is possible to manufacture the lithium secondary battery having significantly excellent high-temperature storage characteristics while minimizing decreases in power and cycle life occurring in the battery using the existing sulfur based additive by using the concentration gradient type cathode active material as the cathode material.

What is claimed is:

1. A lithium secondary battery comprising a cathode, an anode, and a non-aqueous electrolyte,
    wherein the non-aqueous electrolyte contains a sulfur based additive, and
    the cathode contains a cathode active material containing a lithium-metal oxide particle,
    the lithium-metal oxide particle including a core part represented by Chemical Formula 5 and a surface part represented by Chemical Formula 6, a concentration of Ni being decreased in a surface direction within a concentration gradient layer between the core part and the surface part, a concentration of Co being constant between the core part and the surface part and a concentration of Mn being increased in the surface direction between the core part and the surface part:

$$Li_{x4}Ni_{a4}Co_{b4}Mn_{c4}O_{y4}$$ [Chemical Formula 5]

$$Li_{x5}Ni_{a5}Co_{b5}Mn_{c5}O_{y5}$$ [Chemical Formula 6]

wherein in Chemical Formulas 5 and 6, x4, x5, y4, y5, a4, a5, b4, b5, c4, and c5 satisfy $0<x4\leq1.1$, $0<x5\leq1.1$, $2\leq y4\leq2.02$, $2\leq y5\leq2.02$, $0.800\leq a4\leq1.000$, $0\leq a5\leq0.770$, $0<b4\leq0.11$, $0<b5\leq0.11$, $0\leq c4\leq0.090$, $0.120\leq c5\leq1.000$, $0<a4+b4+c4\leq1$, and $0\leq a5+b5+c5\leq1$, wherein the core part has a radius of equal to or greater than 0.6 μm from the center of the lithium-metal oxide particle, and the concentration gradient layer has a width of equal to or greater than 0.2 μm.

2. The lithium secondary battery of claim 1, wherein the sulfur based additive contained in the non-aqueous electrolyte is 1,3-propane sultone, 1,3-propene sultone, or a mixture thereof.

3. The lithium secondary battery of claim 2, wherein the sulfur based additive contained in the non-aqueous electrolyte is 1,3-propane sultone, and a content of 1,3 propane sultone is 0.5 to 2.0 wt %.

4. The lithium secondary battery of claim 2, wherein the sulfur based additive contained in the non-aqueous electrolyte is 1,3-propene sultone, and a content of 1,3 propene sultone is 0.5 to 2.0 wt %.

5. The lithium secondary battery of claim 2, wherein the sulfur based additive contained in the non-aqueous electrolyte is a mixture of 1,3-propane sultone and 1,3-propene sultone, and a content of the mixture is 1.0 to 4.0 wt %.

* * * * *